United States Patent [19]
Love et al.

[11] 3,749,120
[45] July 31, 1973

[54] DIAPHRAGM GAS VALVE WITH ADJUSTABLE OPENING SPEED

[75] Inventors: John J. Love; Carl A. Smith, both of St. Louis, Mo.

[73] Assignee: Emerson Electric Co., St. Louis, Mo.

[22] Filed: Oct. 28, 1971

[21] Appl. No.: 193,503

[52] U.S. Cl. .......................... 137/489.5, 137/495
[51] Int. Cl. ........................................... F16k 31/12
[58] Field of Search............. 137/489.5, 495, 513.3, 137/513.7; 251/36, 45, 37, 47; 138/42, 43

[56] References Cited
UNITED STATES PATENTS

| | | | |
|---|---|---|---|
| 2,030,251 | 2/1936 | Greener............................ | 138/43 X |
| 2,312,834 | 3/1943 | Hahn ................................ | 138/42 X |
| 2,568,123 | 9/1951 | Goldberg.......................... | 138/42 X |
| 3,289,694 | 12/1966 | Frye................................ | 137/513.7 X |
| 3,354,901 | 11/1967 | Dietiker et al................... | 137/489 X |
| 3,447,775 | 6/1969 | Katchka et al................... | 137/489 X |

*Primary Examiner*—Irwin C. Cohen
*Attorney*—Charles E. Markham

[57] ABSTRACT

A biased closed diaphragm operated gas valve having one side of the operating diaphragm exposed to a first zone of pressure, a restricted passageway connects the other side of the diaphragm to the same pressure zone thereby to equalize the pressure on both sides of the diaphragm and permit the gas valve to close, and a branch of the passageway including a control valve connects the other side of the diaphragm to a second zone of different pressure when the control valve is opened thereby resulting in unequal pressure on the diaphragm and causing the valve to be opened. A portion of the passageway between the junction of the branch and the other side of the diaphragm comprises a tortuous spiral path of adjustable length lying along and between the screw threads of a screw threaded portion of the passageway and the threads of a screw threaded member threadedly engaged therein, whereby the change from equal to unequal pressure upon opening of the control valve is slowed and full opening of the gas valve is delayed. There is also the provision of a bypass which is open to flow tending to equalize pressure on opposite sides of the diaphragm and closes in response to a reversal of flow.

7 Claims, 3 Drawing Figures

Patented July 31, 1973
3,749,120
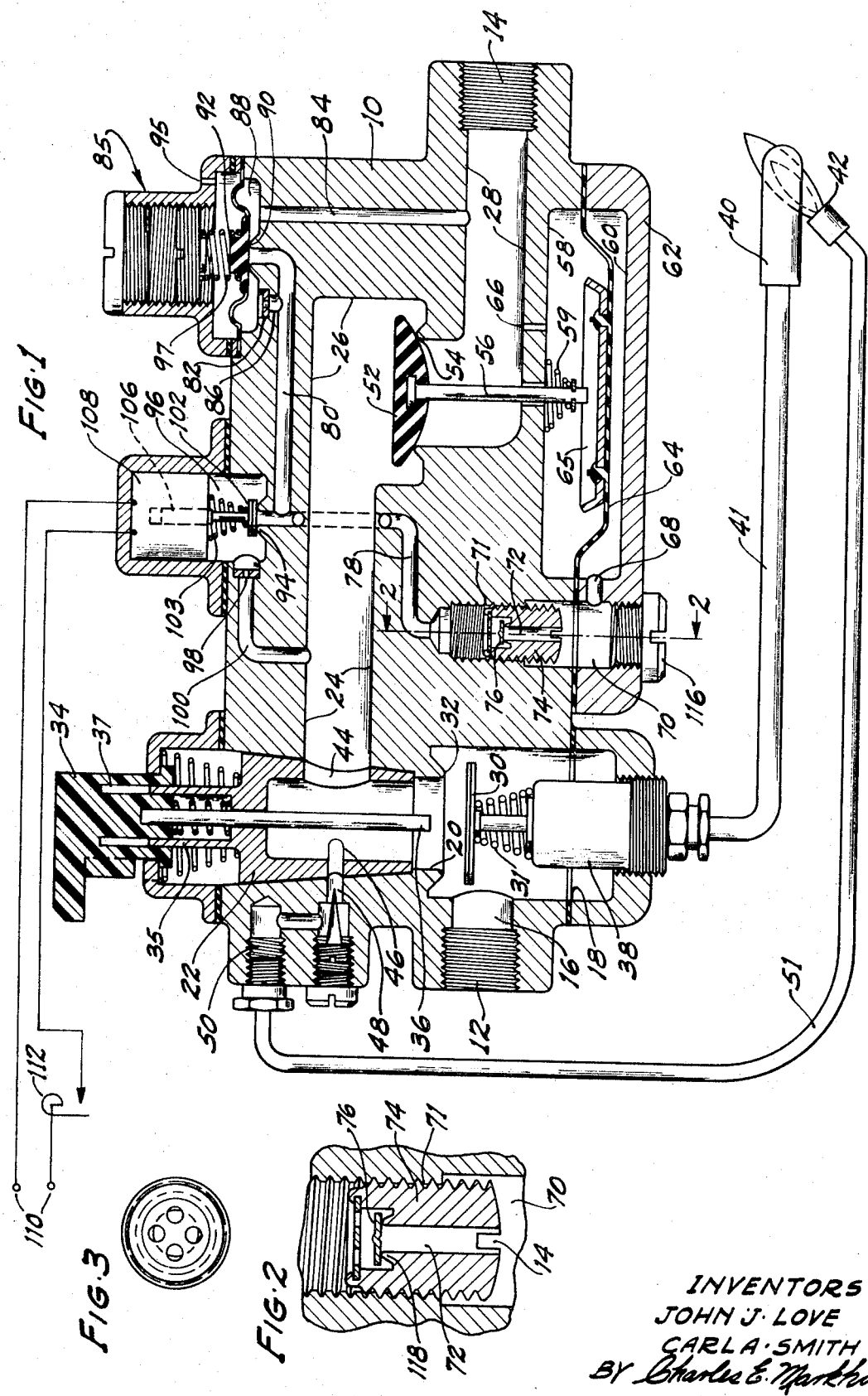
INVENTORS
JOHN J. LOVE
CARL A. SMITH
BY Charles E. Markham
THEIR AGENT

DIAPHRAGM GAS VALVE WITH ADJUSTABLE OPENING SPEED

This invention relates to diaphragm operated gas valves and particularly to means for variably slowing the rate of opening of the valve.

It has been found to be essential in the operation of gas burners in many domestic space heating furnaces to delay a full flow of gas to the burner until sufficient draft through the combustion chamber has developed to supply the required combustion air. A conventional means for accomplishing this in diaphragm operated gas valves is by placing a calibrated orifice in a communicating passageway connecting one side of the operating diaphragm with a pressure zone, thereby to restrict a flow therebetween which effects opening of the gas valve. Such orifice means may also include a needle valve adjustable in the orifice to variably restrict flow therethrough.

Because of the relatively small volume change in the diaphragm chamber required to move the large diameter poppet valve customarily employed in current diaphragm operated gas valves from closed to full flow open position, an orifice to be effective to slow the valve opening movement sufficiently for the purpose must be made quite small. In many valve devices of the size and capacity employed in domestic heating systems and appliances, the orifice would be so small as to be frequently clogged to inoperation by small particles in the gas stream.

An object of the present invention is to provide a diaphragm valve having generally new and improved means for variably restricting communication between one side of the operating diaphragm and a pressure zone which effects opening of the valve, thereby to vary the rate at which the valve opens.

A further object is to provide a biased closed diaphragm operated valve having novel means for variably restricting flow through a passageway in one direction to one side of the operating diaphragm thereby to vary the rate of opening of the valve, which means includes check valve means permitting free flow through the passageway in an opposite direction to permit relatively rapid closure of the valve.

A further object is to provide a diaphragm operated valve in which a long spiral passageway is interposed between a pressure zone and one side of the valve operating diaphragm to restrict the flow and slow the opening of the valve, the length of the passageway being adjusted thereby to vary its resistance to flow.

Further objects and advantages will appear from the following description when read in connection with the accompanying drawing.

In the drawing:

FIG. 1 is a cross-sectional view of a manifold gas valve having a diaphragm operated valve and a device for varying the rate at which the valve opens, constructed in accordance with the present invention;

FIG. 2 is a cross-sectional view of the device for varying the rate of opening of the valve taken along line 2—2 of FIG. 1; and FIG. 3 is a top plan view of the device.

Referring to the drawing, the manifold valve comprises a body 10 having an inlet 12 adapted to be connected to a supply of gas under pressure and an outlet 14 adapted to be connected to a main burner. The inlet and outlet are connected by a passageway 16, a chamber 18, a passageway 20, a hollow rotary plug valve 22, a passageway 24, a chamber 26 and a passageway 28. A cutoff valve 30 cooperates with a seat 32 to control the flow from the inlet to outlet. Valve 30 is biased closed by a spring 31 and is manually opened by depression of a knob 34 having a pin 36 which engages the valve 30. The valve 30 is held open by an electromagnet 38 energized through leads 41 by a thermocouple junction 40 heated by an adjacent pilot burner 42. The hollow plug valve has a main port 44 in the wall thereof which registers with passage 24 when the plug valve is rotated to an on position. The knob 34 is axially slidable relative to the plug valve on circularly spaced tangs 35 which enter circularly spaced slots 36 in the knob. The knob 34 is thereby also keyed to the plug valve for rotation therewith.

The plug valve 22 is also provided with a circumferentially extending pilot port 46 in the wall thereof which registers with a passageway 48 leading to a pilot burner outlet 50 when the plug valve is turned to a pilot position. The pilot port 46 is also in registry with passageway 48 when the plug valve is in an on position. The pilot outlet 50 is connected to pilot burner 42 by a conduit 51.

A main valve 52 cooperating with an annular seat 54 formed in chamber 26 around the exit of passageway 28 also controls the flow from the inlet 12 to outlet 14. Valve 52 has a stem 56 extending downward into an upper diaphragm chamber 58 formed as a recess in body 10, and a spring 59 biases valve 52 downward in a closed position on its seat 54. A lower diaphragm chamber 60 is formed by a cup-shaped member 62 attached to the body 10, and a flexible diaphragm 64 held at its periphery between the body 10 and member 62 defines upper and lower diaphragm chambers 58 and 60. The diaphragm 64 has a relatively rigid disc member 65 centrally positioned and attached thereto. The disc member 65 provides weight to bias the diaphragm downward in the position shown.

The upper diaphragm chamber 58 is adequately vented to outlet passage 28 through a vent 66, so that the upper side of the diaphragm 64 is constantly exposed to pressure existing at outlet 14. The lower chamber 60 is also in constant communication with outlet passage 28 through a passage 68, a passage 70 having an upper screw threaded portion 71, the bore 72 in a screw threaded member 74 threadedly engaged in threaded portion 71, past a check valve 76, through passage 78, a passage 80, a passage 86, a restricting orifice 82, valve chamber 88 of a pressure regulating valve 85, and passage 84. A valve seat 90 is formed around the entrance of passage 80 into valve chamber 88, and a pressure regulator valve 92 formed as a part of a pressure regulator diaphragm cooperates with the seat 90 to regulate further venting of bleed off under operating conditions to be described. The pressure regulator is exposed to atmospheric pressure through a vent 95 and an adjustable spring 97 biases regulator valve 92 closed on its seat 90.

Communication between lower diaphragm chamber 60 and the inlet 12 is also provided through a valve seat 94 at the upper end of passage 78, the valve chamber 96, an orifice 98, a passage 100, the passage 24, main port 44, the hollow plug valve 22, passage 20, chamber 18, and passage 16. A solenoid operated control valve 102 biased closed by a spring 103 cooperates with valve seat 94 to control this communication. The valve 102 has a stem 104 connected to the plunger of a solenoid 106. The solenoid has a winding connected across power source terminals 110 through a space thermostat 112.

The internal thread of the threaded portion 71 of passage 70 is not a full thread, but is cut off as shown in FIG. 2 by drilling the hole to be threaded slightly larger than it should be to obtain a full thread with a standard size tap. The thread of member 74 is, however, a full thread. This arrangement provides a long spiral passageway extending that portion of the length of the thread 71 engaged by the thread on member 74. The cross-sectional area of this spiral passageway may be conveniently determined when using standard taps and dies merely by determining the size of the bore into which thread 71 is cut. It will be understood that instead of drilling the bore oversize to obtain the spiral passageway the diameter of the member 74 may be made less than required to obtain a full standard thread. Also, the diameter of member 74 may be made slightly undersize and the bore slightly oversize so that the thread on the member 74 and the internal thread 71 are both slightly less than full. But, this would result in two parallel spiral passageways to attain the same flow which would be of smaller cross-sectional area and more susceptible to clogging.

The member 74 is provided with a screw driver slot 114 so that the extent of engagement of member 74 in threaded bore 71 may be conveniently varied. A screw threaded closing plug 116 provides access to member 74 for adjustment. It will be seen that the cross-sectional area of the long spiral passageway extending along and between the thread of member 74 and the less than full thread of bore 71 may be made much greater than the area of a short straight orifice and yet provide the same resistance to flow. Not only does the length of the spiral passageway cause a substantial pressure drop, the constantly changing direction of the fluid from a straight to a circular path requires considerably more kinetic energy to move it along and therefore further increases the pressure drop.

A seat 118 is formed at the upper end of the bore 72 in member 74, and check valve 76, which is a very thin lightweight disc, closes on seat 118 in response to any flow toward diaphragm chamber 60, whereby such flow passes through the restricting spiral passageway. Any pressure drop in passage 78 which results in the flow of fluid from diaphragm chamber 60 will cause the disc 76 to lift and permit such flow to pass through the bore 72.

OPERATION

The manifold valve is shown in FIG. 1 in an on position; that is to say, the hollow plug valve is in an on position in which gas may flow through main port 44 to passage 24 and through pilot port 46 to pilot burner 42. Also, the pilot burner is burning and cutoff valve 30 is being held open by electromagnet 38. The space thermostat 112 is open, however, so that the solenoid operated control valve 102 is closed, whereby communication between inlet 12 and the lower diaphragm chamber 60 is cut off. Since upper diaphragm chamber 58 is constantly vented to outlet pressure through vent 66 and lower chamber portion 60 is also constantly vented to the same pressure zone through the orifice 82, the diaphragm 64 is in its lower position and main valve 52 is biased closed by spring 59.

Under these conditions, when space thermostat 112 closes due to a drop in space temperature, solenoid winding 108 is energized and control valve 102 will open, placing lower chamber 60 in communication with inlet 12. The venting or bleed orifice 82 in passage 86 being smaller than the orifice 98 in passage 100, the pressure in lower chamber 60 will increase, causing the diaphragm 64 to flex upward and member 65 to engage the lower end of valve stem 56 and move main valve 52 openward. Under these conditions, pressure will also increase in passage 80 and pressure regulating chamber 88 so that the pressure regulator valve will open and increase the bleed-off rate to that which will result in such eventual open position of main valve 54 which will maintain the desired flow of gas to the main burner.

When control valve 102 opens due to closing of space thermostat 112, the flow of fluid toward chamber 60 is slowed considerably due to its passage through the long spiral passageway along and between the screw threads of bore 71 and member 74. The check valve 76 is closed under these conditions. The pressure build-up in chamber 60 is thereby slowed and the upward flexing of diaphragm 64 and opening of main valve 52 are consequently slowed. If it is desired to further decrease the speed at which valve 54 is being opened, the member 74 is screwed further into the screw threaded bore 71, and if it is desired to increase the speed of valve opening, it is screwed outward.

When space thermostat 112 subsequently opens in response to increasing space temperature resulting from operation of the burner, the valve 102 immediately closes cutting off communication between the inlet 12 and chamber 60. The flow through the member 74 will now be in a reverse direction due to venting through constantly open venting orifice 82, so that check valve 76 will open permitting the flow to pass through bore 72 and permit rapid closing of valve 52.

In the arrangement illustrated, the main valve is biased closed when both sides of the oprating diaphragm are exposed to outlet pressure and the valve is opened when a greater pressure is applied to one side of the diaphragm. In this arrangement, member 74 is arranged so that the check valve closes in response to flow toward the diaphragm chamber. It will be understood that in other widely used arrangements in which the main valve is biased closed when inlet pressure is applied to both sides of the diaphragm and opened when pressure is bled off from one side thereof, the member 74 would be arranged so that the check valve would open in response to a flow toward the diaphragm chamber and close in response to a flow therefrom.

We claim:
1. In a diaphragm operated gas valve, a body member having an inlet for connection to a source of gas under pressure, an outlet for communication with a burner and a main passageway connecting said inlet and outlet, a main valve in said passageway, means biasing said main valve in a closed position, a valve operating diaphragm in said body operative to move said main valve openward when greater pressure is applied to one side thereof than to the other and operative to permit closure of said main valve when substantially equal pressure is applied to both sides thereof, one side of said diaphragm being constantly exposed to the pressure existing in said main passageway on one side of said main valve, means including a communicating passageway for constantly applying the pressure existing in said main passageway on said one side of said main valve to the other side of said diaphragm thereby to equalize the pressure and permit closure of said main valve, a branch of said communicating passageway connecting said communicating passageway with said main passageway on the other side of said main valve, said branch having a control valve therein whereby the opposite sides of said operating diaphragm are exposed to unequal pressure when said control valve is opened and whereby said main valve is moved openward, a portion of said communicating passageway between said branch and said other side of said diaphragm comprising a spiral passage of relatively small cross-sectional area thereby to restrict flow through said communicating passageway and slow the opening of said main valve, said spiral passageway extending along and between the threads of a screw threaded portion of said communicating passageway and a screw threaded member threadedly engaged therein, at least one of said threads being less than a full thread, a bypass passage paralleling said spiral passage comprising a longitudinal bore through said screw threaded member, and a check valve in said bypass operative to prevent flow therethrough in a direction to effect the application of unequal pressure to the opposite sides of said diaphragm.

2. The diaphragm operated gas valve claimed in claim 1 in which a portion of said communicating passageway adjoining one end of the screw threaded portion of said communicating passageway is enlarged, thereby permitting free flow around an exposed portion of said screw threaded member when it is only partially engaged in said screw threaded portion, and said screw threaded member including a head portion for rotating said member whereby adjustment of the length of said spiral restricting path is achieved by varying that portion of the screw threaded member which is threadedly engaged.

3. The diaphragm operated gas valve claimed in claim 1 in which both sides of said diaphragm are exposed to pressure existing in said main passageway downstream from said main valve and in which said branch of said communicating passageway connects said communicating passageway with said main passageway at a point upstream from said main valve.

4. In a diaphragm operated gas valve, a body member having a main inlet and a main outlet, and a main passageway connecting said inlet and outlet, a main valve in said passageway, means biasing said valve in a closed position, a flexible operating diaphragm forming a movable wall defining an expansible chamber and operative to move said main valve openward when unequal pressure is applied to the opposite sides thereof, the outside of said diaphragm being exposed to the pressure existing in said main passageway on one side of said main valve, a communicating passageway connecting said expansible chamber with said main passageway on said one side of said main valve thereby to equalize the pressure on said opposite sides of said diaphragm, and a branch of said communicating passageway leading to said main passageway on the other side of said main valve thereby to effect an unequal pressure on opposite sides of said diaphragm, a control valve in said branch, means in said communicating passageway between the junction of said branch and said chamber operative to restrict flow therethrough in a direction which effects the application of unequal pressure to opposite sides of said diaphragm and permits free flow in an opposite direction, said means comprising a screw threaded portion of said communicating passageway and a screw threaded member engaged therein, at least one of said screw threads being an incomplete thread thereby to provide a long spiral path extending between and along the engaged threads, and said screw threaded member having an axial bore therethrough and a check valve controlling said axial bore.

5. The diaphragm operated gas valve claimed in claim 4 in which the minor diameter of the threaded portion of said communicating passageway is greater than that which would result in a full thread.

6. The diaphragm operated gas valve claimed in claim 4 in which the major diameter of said screw threaded member is less than that which would result in a full thread.

7. The diaphragm operated gas valve claimed in claim 4 in which a portion of said communicating passageway adjoining one end of said screw threaded portion thereof is larger in diameter than the major diameter of said screw threaded member thereby to permit free flow around any portion of said screw threaded member extending therein, and said screw threaded member having a head portion for rotating said member whereby adjustment of the length of said spiral path is achieved by varying that portion of the screw threaded member which is threadedly engaged.

* * * * *